(12) United States Patent
Atarashi

(10) Patent No.: US 7,912,639 B2
(45) Date of Patent: Mar. 22, 2011

(54) ROAD MAP DATA GENERATION METHOD, ROAD MAP DATA UPDATE SYSTEM, AND ROAD MAP DATA MANAGEMENT DEVICE

(75) Inventor: Yasutaka Atarashi, Kariya (JP)

(73) Assignee: Denso Corporation, Kariya (JP)

( * ) Notice: Subject to any disclaimer, the term of this patent is extended or adjusted under 35 U.S.C. 154(b) by 808 days.

(21) Appl. No.: 11/541,949

(22) Filed: Oct. 2, 2006

(65) Prior Publication Data

US 2007/0093960 A1 Apr. 26, 2007

(30) Foreign Application Priority Data

Oct. 4, 2005 (JP) ................................. 2005-291150

(51) Int. Cl.
G01C 21/32 (2006.01)
(52) U.S. Cl. .................................. 701/212; 340/995.14
(58) Field of Classification Search .................. 701/208, 701/211, 212
See application file for complete search history.

(56) References Cited

U.S. PATENT DOCUMENTS

| | | | | |
|---|---|---|---|---|
| 5,150,295 | A | * | 9/1992 | Mattingly ........................... 702/5 |
| 5,614,895 | A | * | 3/1997 | Ohomori et al. .......... 340/995.15 |
| 5,754,846 | A | * | 5/1998 | Janse et al. ...................... 707/100 |
| 5,978,733 | A | * | 11/1999 | Deshimaru et al. ............ 701/209 |
| 6,058,350 | A | * | 5/2000 | Ihara .............................. 701/208 |
| 6,453,233 | B1 | * | 9/2002 | Kato .............................. 701/208 |
| 6,636,802 | B1 | * | 10/2003 | Nakano et al. ................ 701/208 |
| 6,643,584 | B1 | * | 11/2003 | Ikeuchi et al. ................. 701/209 |
| 6,728,633 | B2 | * | 4/2004 | Mikuriya et al. .............. 701/208 |
| 6,922,157 | B2 | * | 7/2005 | Kimura ..................... 340/995.14 |
| 7,403,852 | B2 | * | 7/2008 | Mikuriya et al. .............. 701/208 |
| 7,472,019 | B2 | * | 12/2008 | Hara .............................. 701/201 |
| 7,526,492 | B2 | * | 4/2009 | Mikuriya et al. .............. 707/100 |
| 2002/0004701 | A1 | * | 1/2002 | Nakano ......................... 701/200 |
| 2002/0091485 | A1 | * | 7/2002 | Mikuriya et al. .............. 701/208 |

(Continued)

FOREIGN PATENT DOCUMENTS

EP 1 134 674 9/2001

(Continued)

OTHER PUBLICATIONS

Office Action dated Dec. 14, 2007 in Chinese Application No. 2006 10142134.2 with English translation thereof.

(Continued)

*Primary Examiner* — Thomas G Black
*Assistant Examiner* — Sze-Hon Kong
(74) *Attorney, Agent, or Firm* — Harness, Dickey & Pierce, PLC

(57) ABSTRACT

A navigation device has a regional map data item for each of multiple regions, into which a nation is divided. A connection table is included in a regional map data item for a certain region and associates (i) a certain ID of a connection road in the certain region with a certain connection number. The connection road is connected with a paired connection road in an adjacent region. A connection table of a regional map data item for the adjacent region associates an ID of the paired connection road with the same connection number as the certain connection number. When the certain ID in the certain region is replaced with a different ID because of a road construction or the like, only the certain ID is replaced in the connection table with the certain connection number unchanged. This eliminates need of amending the connection table for the adjacent region.

4 Claims, 13 Drawing Sheets

U.S. PATENT DOCUMENTS

| | | | |
|---|---|---|---|
| 2003/0204308 A1* | 10/2003 | Uchida | 701/209 |
| 2004/0133344 A1* | 7/2004 | Hashida et al. | 701/208 |
| 2005/0049784 A1* | 3/2005 | Ikeuchi et al. | 701/208 |
| 2006/0173614 A1* | 8/2006 | Nomura | 701/210 |
| 2007/0126605 A1* | 6/2007 | Aleksic et al. | 340/995.14 |
| 2008/0201073 A1* | 8/2008 | Adachi et al. | 701/210 |

FOREIGN PATENT DOCUMENTS

| | | | |
|---|---|---|---|
| JP | 09-145383 | | 6/1997 |
| JP | 11-174953 | | 7/1999 |
| JP | 11174953 A | * | 7/1999 |
| JP | 2004-178248 | | 6/2004 |
| JP | 2004-294599 | | 10/2004 |
| JP | 2004-354268 | | 12/2004 |
| JP | 2005-241729 | | 9/2005 |
| KR | 2005006903 A | * | 1/2005 |

OTHER PUBLICATIONS

Search Report dated Jan. 30, 2007 in GB Application No. GB0619617.4.

Office Action dated Apr. 28, 2008 in German Application No. 10 2006 046969.0 with English translation thereof.

Examination Report dated May 19, 2010 in Great Britain Application No. GB0619617.4.

Office Action dated Aug. 24, 2010 in corresponding Gt. Britain Application No. GB0619617.4.

* cited by examiner

DATA ID="ID"+[L][X][Y],
EX. ID010401

UPDATE DUE TO NEW ROAD (DEPENDENCE TABLE) 33b

| ID+VER. | DEPENDENCE LIST |
|---|---|
| ID010101v2 | ID010102v2 |
| ID010101v3 | ID010102v3 |
| ID010102v2 | ID010101v2 |
| ID010102v3 | ID010101v3, ID010103v3 |
| ID010102v4 | ... |
| ... | ... |

(UPDATE DB) 33a'

(DEPENDENCE TABLE) 33b'

| ID+VER. | DEPENDENCE LIST |
|---|---|
| GID010101v2 | GID010102v2 |
| GID010101v3 | GID010102v3 |
| GID010102v2 | GID010101v2 |
| GID010102v3 | GID010101v3, GID010103v3 |
| GID010102v4 | ... |
| ... | ... |

ROAD MAP DATA GENERATION METHOD, ROAD MAP DATA UPDATE SYSTEM, AND ROAD MAP DATA MANAGEMENT DEVICE

CROSS REFERENCE TO RELATED APPLICATION

This application is based on and incorporates herein by reference Japanese Patent Application No. 2005-291150 filed on Oct. 4, 2005.

FIELD OF THE INVENTION

The present invention relates to a road map data generation method, a road map data update system, and a road map data management device.

BACKGROUND OF THE INVENTION

A navigation device has road map data indicating road connections. The road connections can be expressed using link data and node data.

The link data includes, with respect to a link, characteristic data such as a link ID identifying the link, coordinates of both ends of the link (road), a road type, a road length, and a road width. The node data includes, with respect to a node, characteristic data such as a node ID identifying the node, link IDs of links connected with the node, and a node type (e.g., intersection, fork, junction). In this road map data, road connections are expressed by assigning link IDs to node data.

Other than navigation devices, the following devices have road map data: a device for managing road map data by dividing all area into divisional regions, a device for updating road map data with respect to each of the divisional regions, and a device for updating road map data with respect to each link. (See Patent Documents 1 to 4)
    Patent Document 1: JP-3391171 B2
    Patent Document 2: JP-2004-178248 A
    Patent Document 3: JP-2004-294599 A
    Patent Document 4: JP-2004-354268 A When the road map data is divided depending on each divisional region, updating the road map data can be made without need of updating the road map data corresponding to all the area. This simplifies update of the road map data. In this case, a road connection is expressed such that a link ID or node ID of a connecting end in a certain divisional region is directly associated with a link ID or node ID of a connected end in a neighboring divisional region. Therefore, when a link ID or node ID in the certain divisional region is changed and the road map data in the certain divisional region is thereby updated, the road map data in the neighboring divisional region needs to be updated simultaneously.

For instance, in Patent Document 1, border nodes have connection information of neighboring divisional regions. When a node ID or link ID is changed and road map data is updated (see FIG. 13), the connection information of the border nodes needs to be updated.

With reference to FIG. 14, the detailed explanation will be added below. As shown in map data D'11 and D'21 in FIG. 14, the border node of ID "N21" in a first divisional region has connection information indicating link ID "L11" as a connected link in a second divisional region next to the first divisional region. The connected link is then changed from the link of ID "L11" to the link of ID "L12" due to a new road construction in the second divisional region, as shown in map data D'22 in FIG. 14.

This breaks off the road connection between the border node of "N21" and the connected link of "L11." Accordingly, to maintain the road connection, the road map data D'11 needs to be updated to change the connected link ID from "L11" to "L12," as shown in map data D'12 in FIG. 14.

A certain update method may be proposed that update of road map data be executed not to involve change of a link ID or node ID connecting to a border. However, this results in discontinuous assignment of IDs by disregarding practical geographical arrangement of nodes and links. Therefore, efficiency in retrieval of information within the road map data is degraded. In other words, when the retrieval efficiency is prioritized, assignment of IDs needs to meet retrieval algorithm. As a result, the above certain method poses the problem in information retrieval.

Further, another method may be proposed that, to prevent road map data update only for changing connection information, connection data be prepared independently from the road map data in each divisional region as shown in D'41 in FIG. 15A. With respect to the node of ID "N21" in a first divisional region (see D'31 in FIG. 15A), suppose the case where a connected link in a second divisional region is changed from the link of ID "L11" to the link of ID "L12" (i.e., D'51 is updated to D'52). In this case, the connection data D'41 between the node of ID "N21" and the link of ID "L11" is updated to D'42 without need to update the road map data D'31.

Preparing the above connection data may apply to a system for updating road map data of each divisional region. In this system, each of multiple combinations of road map data versions of neighboring divisional regions requires corresponding connection data, which complicates works for data generation.

For instance, road map data having versions 1 to N (N: positive integer) requires N×N version combinations between two neighboring divisional regions. FIG. 15B illustrates an example of combinations in case of N equal to three. As a result, in the system to change road map data with respect to each divisional region, the above method requires a data provider to prepare connection data items equal to the square of the number of versions.

SUMMARY OF THE INVENTION

It is an object of the present invention to provide an effective update of road map data.

According to an aspect of the present invention, a road map data generation method is provided with the following: (i) generating a regional map data item for each region of a plurality of regions, the regional map data item indicating road connections within the each region, the each region including a connection road connected with a paired connection road in an adjacent region, which is included in the regions and neighboring the each region; (ii) assigning, to a pair of the connection road and the paired connection road, a pair of connection numbers to thereby provide the regional map data item for the each region with connection information, which indicates a correspondence between the connection road and one of the pair of connection numbers; and (iii) generating wide area road map data, which covers the regions and indicates road connections between neighboring regions of the regions, by storing regional map data items of the regions in a storage medium such that a regional map data item for each region of the regions is provided with the connection information and position information of the each region.

According to another aspect of the present invention, a road map data update system is provided with a communicating device and an update data provision device. The communicating device includes a road map data storage unit storing road map data, which includes regional map data items, each of which is for each region of a plurality of regions. The each region includes a connection road connected with a paired connection road in an adjacent region, which is included in the regions and neighboring the each region. A pair of the connection road and the paired connection road are assigned a pair of connection numbers. The regional map data item for the each region includes main data and auxiliary data. The main data indicates road connections within the each region, while the auxiliary data indicates a correspondence between the connection road and one of the pair of connection numbers. The update data provision device includes an update data storage unit storing update data for updating the road map data in the communicating device. The update data includes main update data for updating the main data and auxiliary update data for updating the auxiliary data so as to update the correspondence to meet the main data which has been updated. The update data provision device transmits the update data to the communicating device when a transmission condition is satisfied. The communicating device updates main data and auxiliary data in a regional map data item corresponding to the update data which is received from the update data provision device.

According to yet another aspect of the present invention, a road map data management device is provided with the following. A road map data storage unit stores road map data, which includes regional map data items, each of which is for each region of a plurality of regions. The each region includes a connection road connected with a paired connection road in an adjacent region, which is included in the regions and neighboring the each region. A pair of the connection road and the paired connection road are assigned a pair of connection numbers. The regional map data item for the each region includes main data and auxiliary data. The main data indicates road connections within the each region, while the auxiliary data indicates a correspondence between the connection road and one of the pair of connection numbers. Update data obtaining means obtains, from an outside, update data for updating the map data. The update data includes main update data for updating the main data and auxiliary update data for updating the auxiliary data so as to update the correspondence to meet the main data which has been updated. Data updating means updates main data and auxiliary data in a regional map data item corresponding to update data which is obtained by the update data obtaining means.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Example

Figure 1:
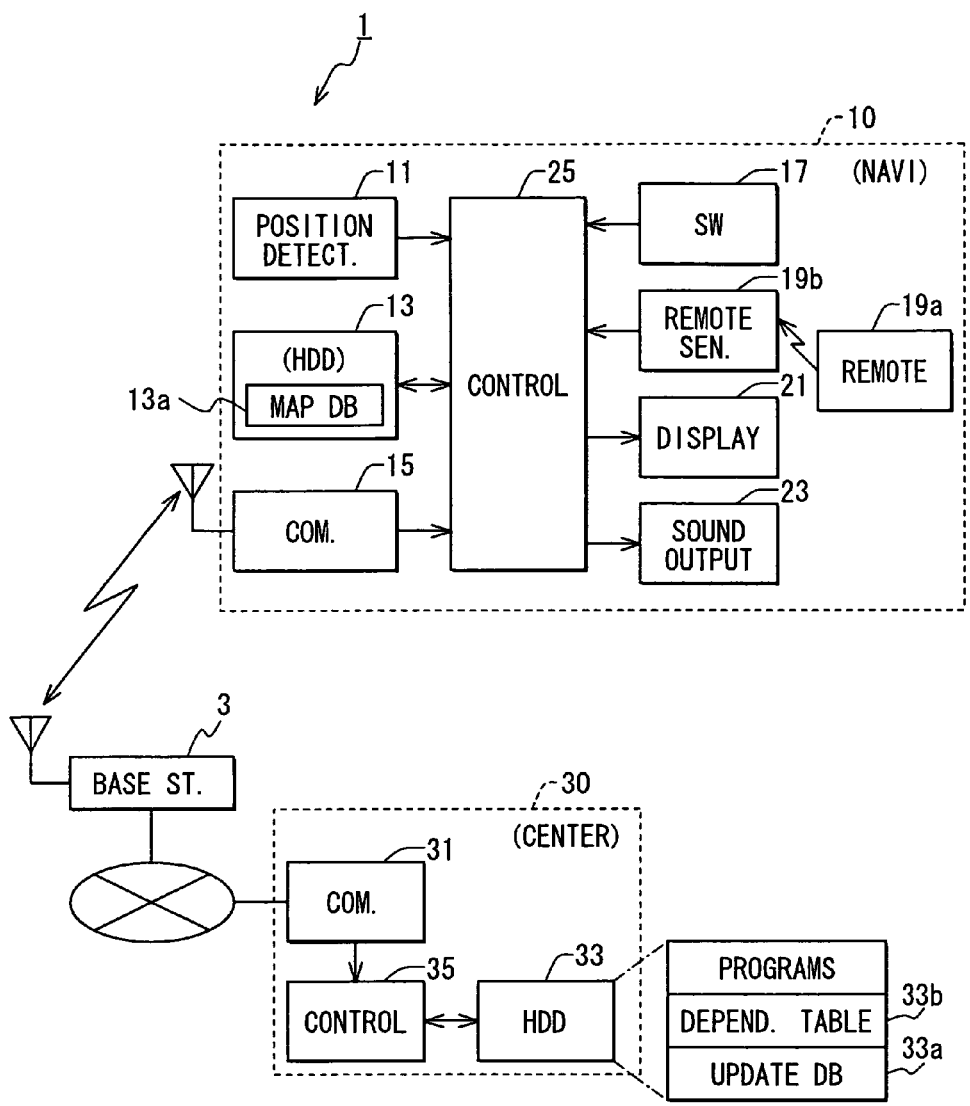
FIG. 1 is a diagram illustrating an overall configuration of a road map data update system as a first example of an embodiment according to the present invention.

A road map data update system 1 as a first example of an embodiment according to the present invention will be explained below. As shown in FIG. 1, the road map data update system 1 includes navigation devices 10 and a center device 30 that updates a map database 13a in the navigation device 10. That is, the navigation device 10 may function as a communicating device to communicate with the center device 30 via a wireless base station 3 and also function a road map data management device to update the map database 13a, while the center device 30 may function as a update data provision device.

The navigation device 10 includes: a position detector 11, a hard disk device 13, a communicator 15, an operation switch group 17, a remote sensor 19b and remote 19a, a display unit 21, a sound output unit 23, and a control unit 25.

The position detector 11 includes a GPS receiver, which receives radio waves from artificial satellites for GPS (Global Positioning System) through a GPS antenna and detects a position, heading direction, or speed of the vehicle. The position detector 11 outputs detection results or the like to the control unit 25. The position detector 11 may include a gyroscope for detecting the magnitude of rotational motion applied to the vehicle, a distance sensor for detecting the distance traveled by the vehicle, and a geomagnetic sensor for detecting the heading direction of the vehicle.

The hard disk device 13 includes various programs in addition to the map database 13a. The communicator 15 communicates with the center device 30 via the wireless base station 3. The operation switch group 17 and remote 19a function as a user interface for accepting instructions or operations by a user.

In detail, the operation switch group 17 includes a touch panel integrated into the display unit 21 or mechanical key switches surrounding the display unit 21, and transmits instructions from the user to the control unit 25. The remote sensor 19b detects transmission signals from the remote 19a and transmits detection results to the control unit 25.

The display unit 21 is a color display device including a liquid crystal monitor. The display unit 21 displays a map surrounding a current position of the vehicle or a route to a destination designated by the user, based on controls of the control unit 25. The sound output unit 23 includes a speaker to output guidance speeches related to a route guidance to the destination, based on controls of the control unit 25.

The control unit 25 includes a CPU, RAM, and ROM. The CPU implements various programs to control each component in the navigation device 10 to perform a map display function, a route guidance function, a map data update function, or the like.

For instance, the control unit 25 specifies a current position of the vehicle as a set of position coordinates and heading direction based on detection results from the position detector 11. The control unit 25 then obtains road map data relating to the current position and displays a road map around the current position on the display unit 21.

Further, upon accepting a route guidance instruction from the user via the user interface, the control unit 25 computes an optimum route from the current position to a destination designated based on the instruction, using a known method such as the Dijkstra method. Then a route guidance is performed via the display unit 21 and sound output unit 23. For instance, a guidance route is superimposed on the map surrounding the current position in heavy lines; a turn direction of the vehicle is announced along the guidance route.

Figure 2:
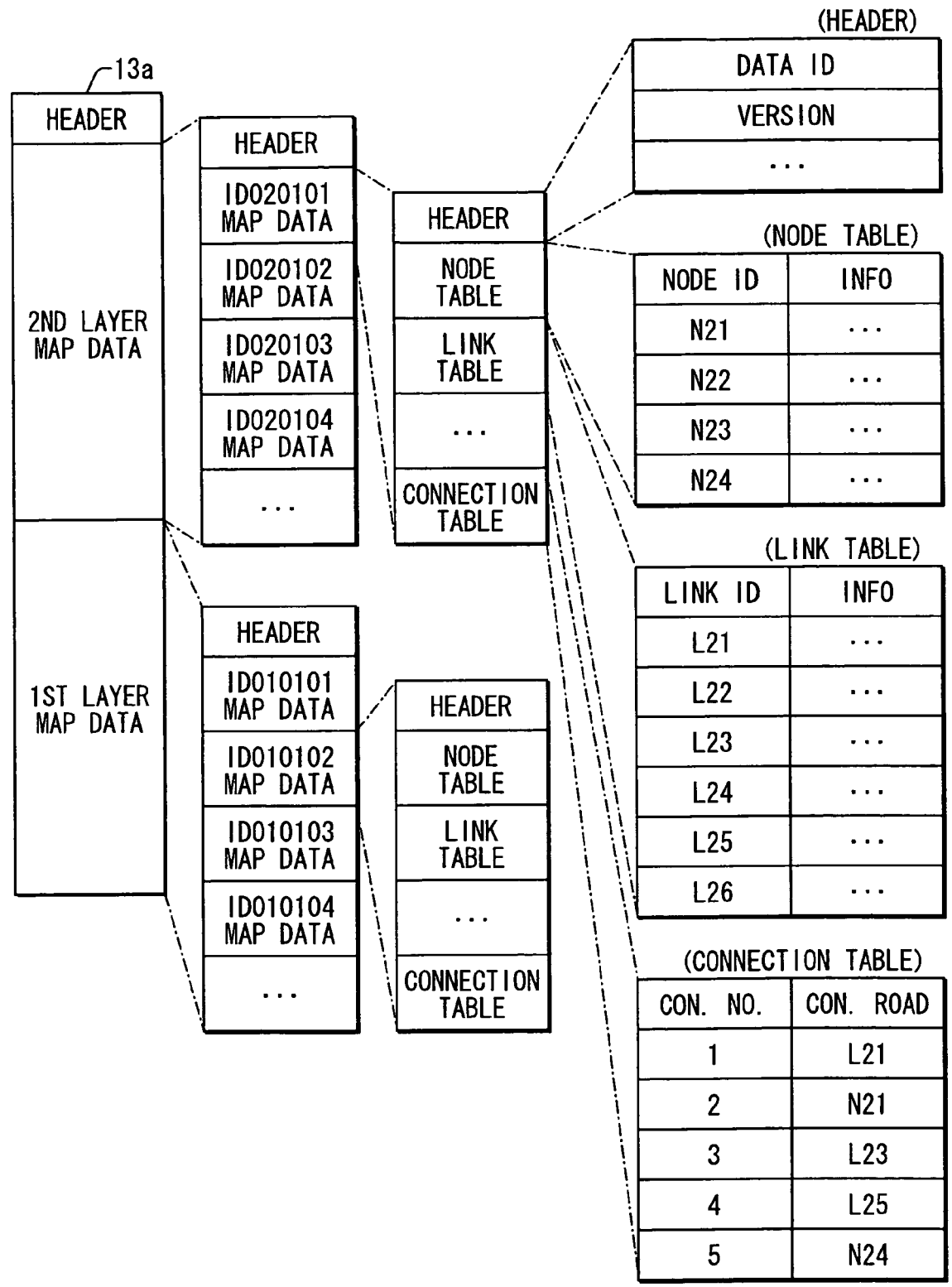
FIG. 2 is a diagram illustrating a configuration of a map database of the first example.

The map database 13a in the navigation device 10 has a configuration shown in FIG. 2. It includes a first layer map data and a second layer map data. Each of the first layer map data and second layer map data covers the entire area of a nation.

The second layer map data is used for displaying a map covering a wide area (or in small scale ratio) or for retrieving a route over a long distance. This second layer map data indicates road connections primarily relating to main roads. In contrast, compared with the second layer map data, the first layer map data indicates detailed road connections relating to narrow roads and is used for displaying a map in a large scale ratio.

Figure 3:
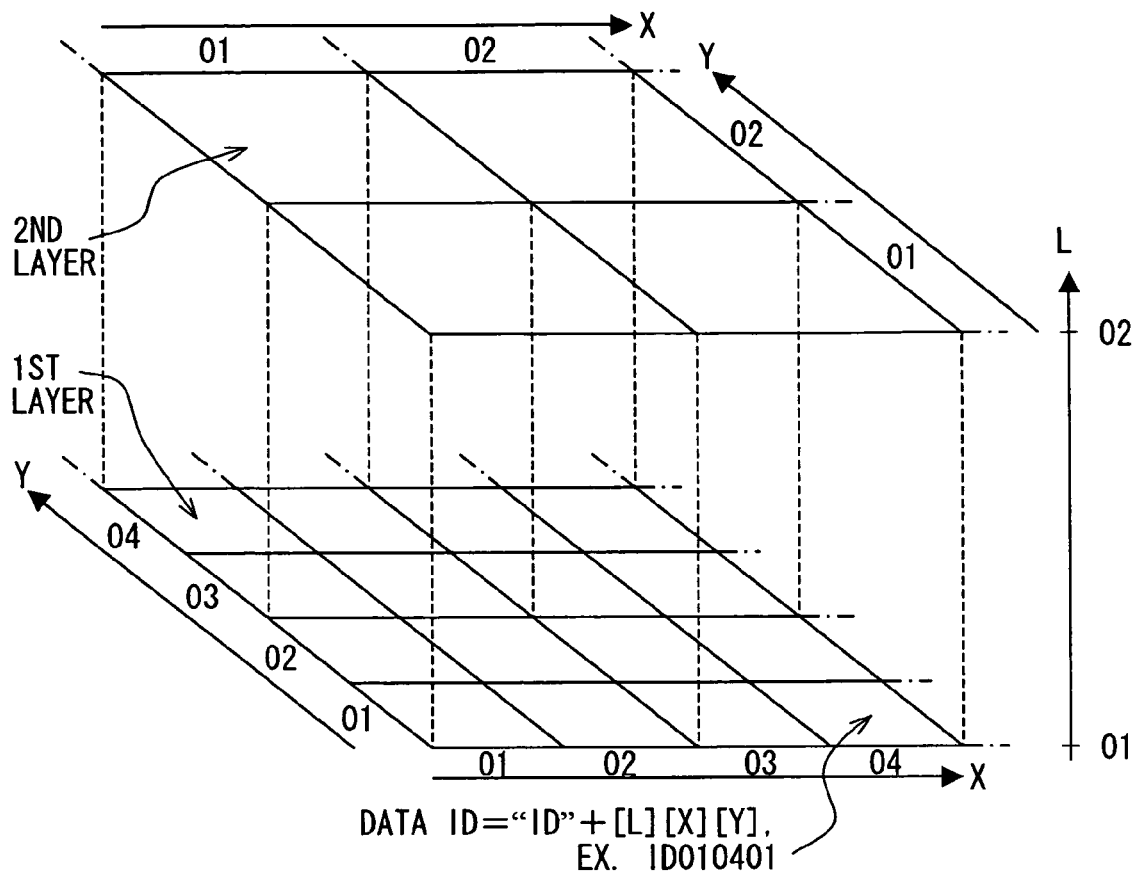
FIG. 3 is a view illustrating a configuration of a first layer map data and a second layer map data.

In this example, the entire area of the nation from the north east end point to the south west end point is divided into divisional regions in meshes, each of which corresponds to a divisional region. A map data item (regional map data item) is prepared with respect to each mesh or divisional region. The aggregate of the regional map data items represents the map of the entire area of the nation. The first or second layer map data includes a group of regional map data items. As shown in FIG. 3, each of regional map data items of the first and second layer map data is assigned a data ID according to a position of the corresponding divisional region.

For instance, an X axis is set along the east-to-west direction to assign an X coordinate (X=1 to n (positive integer)) from the east end divisional region (X=1). A Y axis is set along the north-to-south direction to assign a Y coordinate (Y=1 to n (positive integer)) from the north end divisional region (Y=1). An L axis is set to indicate a layer by assigning L=1 to the first layer and L=2 to the second layer. Each first or second layer regional map data item is assigned a data ID of a character string including values of L, X, and Y in this order.

Each regional map data item includes a header, node table, link table, and connection table. The header includes the data ID and a version of the map data item itself.

The node table collects node information to indicate road connections in each divisional region. For instance, the node table includes characteristic information of nodes while individually associating node IDs identifying the nodes. The characteristic information includes, with respect to each node, coordinates, link IDs of links connected with, and a node type.

The link table collects link information to indicate road connections in each divisional region. For instance, the link table includes characteristic information of links while individually associating link IDs identifying the links. The characteristic information includes, with respect to each link, coordinates of both ends of the link (road), a road type, a road length, and a road width.

The connection table indicates road connections with a neighboring divisional region. The connection table includes connection correspondence between a connection number and an ID of a road (i.e., node or link), which connects with a road (i.e., node or link) in the neighboring divisional region at a border with the neighboring divisional region.

In other words, an identical connection number is provided in the connection table to be assigned to a pair of a first road (i.e., node or link) and a second road (i.e., node or link), which are connected with each other at a border between two neighboring divisional regions. This identical connection number is included in the two connection tables in road map data of the two neighboring divisional regions. Here, the connection tables are attached to the map data, including the link table and node table, in a manufacturing stage of the navigation device 10. Thus configured divisional region road map data items are associated with the data IDs and stored in the hard disk device 13. In this example, the first and second layer map data are generated to include connection tables having connection numbers for indicating road connections between neighboring divisional regions.

Figure 4:
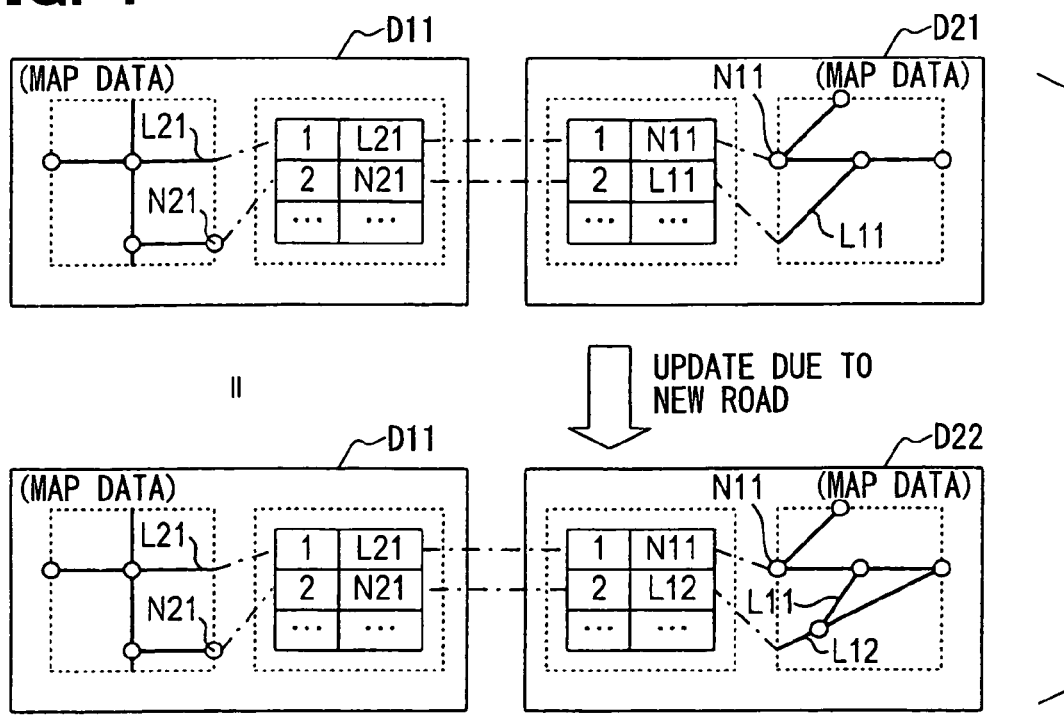
FIG. 4 is a diagram illustrating characteristics of map data of the first example.

Features of the map data will be explained with reference to FIG. 4, which indicates road connections between neighboring divisional regions. Referring to map data D11 and D21 in FIG. 4, the road of link ID "L21" and the road of node ID "N11" are connected (or forms a road connection) between a first and second divisional regions, respectively. This road connection is assigned the connection number 1. For instance, the connection number 1 associated with "L21" is included in a connection table in the map data D1 of the first divisional region.

Further, the road of node ID "N21" and the road of link ID "L12" are connected (or forms a road connection) between the mutually neighboring first and second divisional regions. This road connection is assigned the connection number 2. For instance, the connection number 2 associated with "N21" is added in the connection table in the map data D1 of the first divisional region.

Thus configured map data allows update of map data of a divisional region without need of update of map data of a neighboring divisional region. For instance, even when the map data D21 of the second divisional region is changed to the map data D22 in FIG. 4, the navigation device 10 can maintain the road connections normal in the map database 13a without need of updating the map data D11 of the neighboring first divisional region.

Here, a new road construction causes map data D21 to need updating to new version map data D22. That is, the road of link ID "L11" is replaced with roads of link IDs "L12" and "L11," and the link ID connected with the node ID "N21" is changed from "L11" to "L12," while the link ID "L12" assigned the connection number 2 is substituted for the link ID "L11." In contrast, no update is required in the map data D11. Thus the road connections between the neighboring divisional regions can be identified using the connection numbers in the connection tables and maintained normal. Accordingly, the navigation device 10 of the first example can effectively update regional map data.

In FIG. 2, the connection numbers 1 to 5 in the connection table are expressed using sequential numbers; however, they may be not sequential numbers. Further, in FIG. 4, the connection numbers 1 and 2 are used both in the map data D11 (or D12) and map data D21 (or D22) for identifying the two road connections between the two divisional regions. However, to identify a certain road connection, for instance, a pair of a first number or ID and a second number or ID can be used instead of an identical connection number. For instance, in the map data D11, the connection number "1" is replaced by the connection number "E1," while in the map data D21, the connection number "1" is replaced by the connection number "WV1." These "E1" and "VV1"are not numbers identical to each other, but numbers pairing with each other or associated with each other. This numbering method can be allowed in the assumption that designating one E1 or W1 of the paring numbers E1 and W1 results in identifying the other W1 or E1.

Next, a configuration of the center device 30 will be explained below. As shown in FIG. 1, the center device 30 includes a communicator 31 communicating with the communicator 15 in the navigation device 10, a hard disk device 33, and a control unit 35 having a CPU, a ROM, and a RAM for controlling components of the center device 30.

The hard disk device 33 includes an update map database (DB) 33*a* for updating the map database 13*a* in the navigation device 10 and a dependence table 33*b*, in addition to various programs executed by the control unit 35.

Figures 5A, 5B:
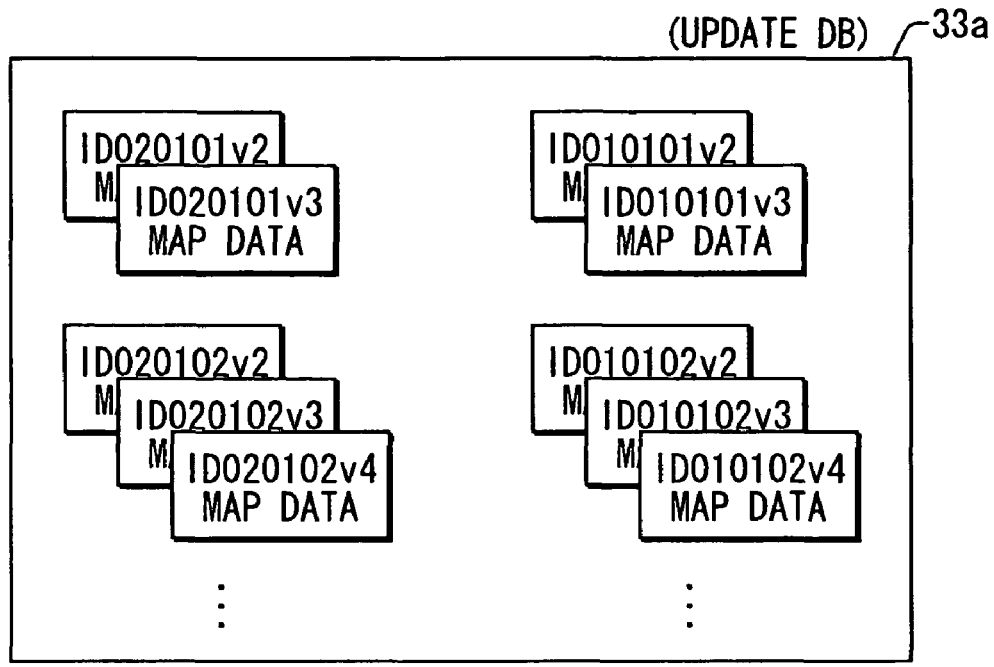
FIG. 5A is a diagram illustrating a configuration of an update map database of the first example.
FIG. 5B is a diagram illustrating a configuration of a dependence table of the first example.

A configuration of the update map database 33*a*, shown in FIG. 5A, includes map data items for various versions for replacing the map data included in the map database 13*a* in the navigation device 10.

That is, the update map database 33*a* includes all versions, except the initial version (v1), of each regional map data item having the same configuration (including a header, node table, link table, and connection table) with respect to each of the divisional regions (meshes).

The dependence table 33*b* in FIG. 5B illustrates a list of dependence relations of map data items registered in the update map database 33*a*. For instance, in a certain dependence relation, a certain map data item is associated with map data items, which depend on the certain map data item (or which the certain map data item depends on) and should be simultaneously updated. For instance, a string of new roads (including links and nodes) is constructed over several divisional regions requires update of a group of map data items of the several divisional regions. The dependence table 33*b* is used for simultaneously transmitting, as a package, the group of map data items depending on each other.

The dependence table 33*b* uses data IDs with versions. As explained above, each data ID includes position information of each divisional region but no version information, so cannot indicate map data items depending on each other with the version information reflected. Thus, the dependence table uses data IDs assigned versions following the IDs.

For instance, in FIG. 5B, a map data item of "ID010101v2," indicating an ID of "010101" and a version of "2" has a dependence relation with a map data item of "ID010102v2," indicating an ID of "010102" and a version of "2." Further, a map data item of "ID010102v3" has dependence relations with map data items of "ID010101v3" and "ID010103v3."

When the center device 30 receives update request data for requesting a latest version of map data of a certain data ID from the navigation device 10, it provides the latest version of the map data of the certain data ID and map data having the dependence relation with the map data of the certain data ID to the navigation device 10.

Figure 6:
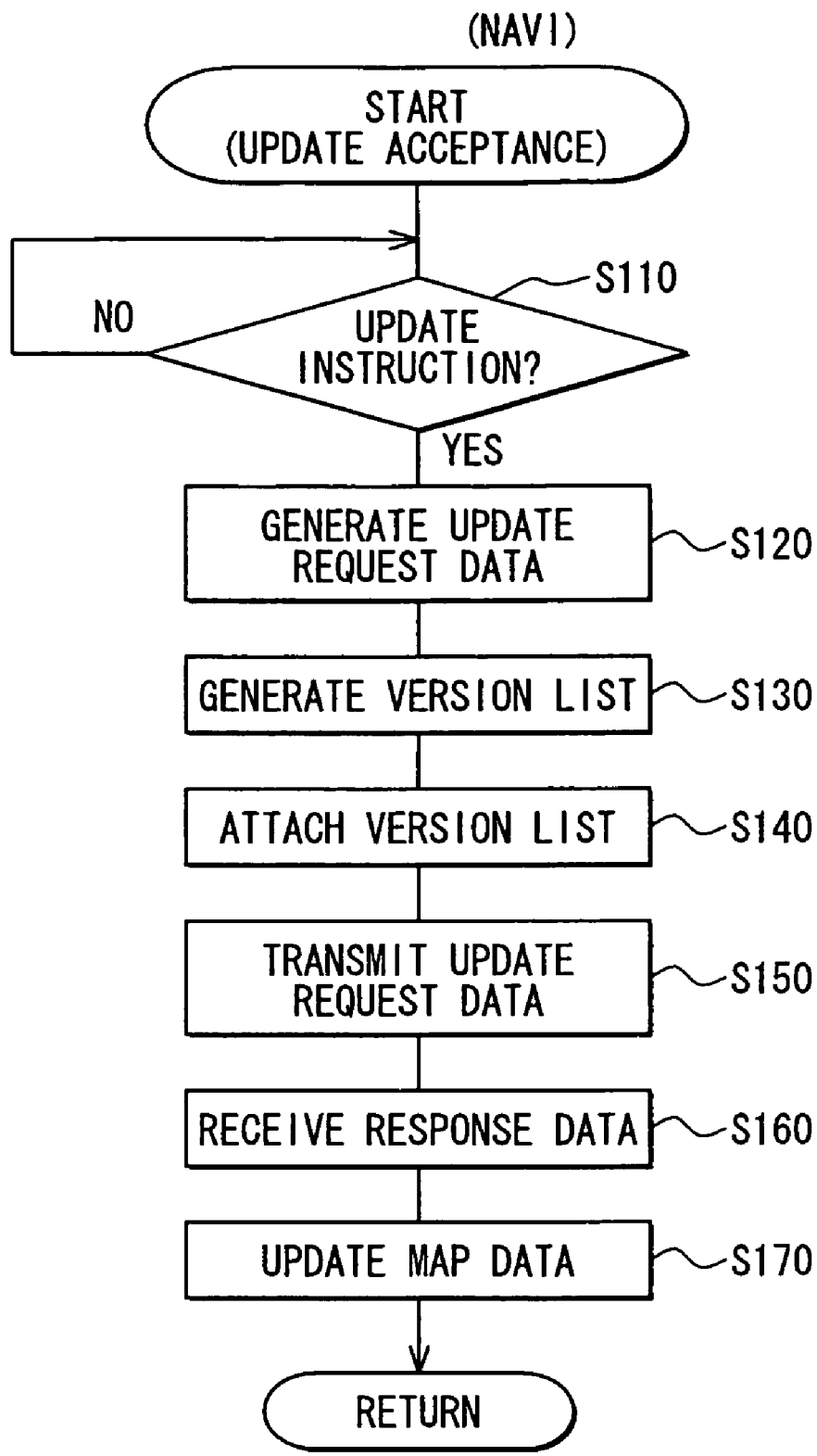
FIG. 6 is a flowchart diagram illustrating an update acceptance process of a navigation device of the first example.
Figure 7:
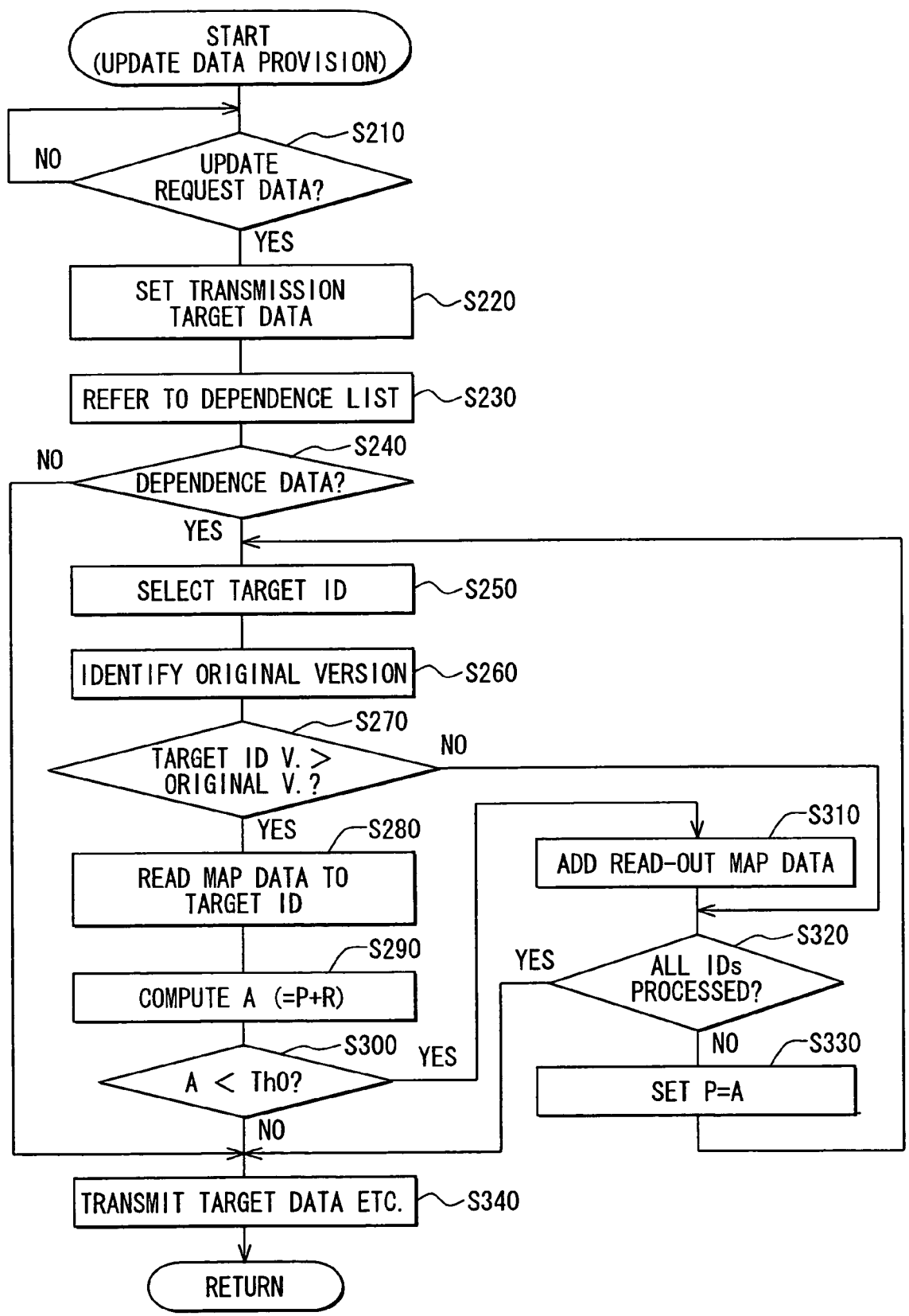
FIG. 7 is a flowchart diagram illustrating an update data provision process of a center device of the first example.

This function is achieved by an update data provision process in FIG. 7 executed by the control unit 35. This function will be explained along with an update acceptance process in FIG. 6 by the navigation device 10 below.

A flowchart of the update acceptance process repeatedly executed by the control unit 25 in the navigation device 10 is shown in FIG. 6; a flowchart of the update data provision process repeatedly executed by the control unit 35 in the center device 30 is shown in FIG. 7.

As an update acceptance process is started, the control unit 25 waits until an update instruction for requesting update of map data is inputted (S110). When the update instruction is inputted (S110: YES), the control unit 25 proceeds to S120. For instance, the control unit 25 determines that an update instruction is inputted when a signal for designating an update divisional region for updating map data is inputted via the user interface. Alternatively, an update instruction may be inputted from a task issuing an update instruction for updating map data relating to a current position with predetermined intervals.

At S120, the control unit 25 generates update request data indicating a request data ID of a data ID assigned to map data of a divisional region designated by the update instruction, e.g., an update divisional region designated by the user or a divisional region including a current position. The control unit 25 then generates a version list indicating versions of regional map data items registered in the map database 13*a* (S130) and attaches it to the update request data (S140). This version list associates data IDs and versions with each other, both of which are included in the headers of regional map data items (see FIG. 2).

The control unit 25 transmits the update request data including the request data ID and version list to the center device 30 via the communicator 15 (S150). The control unit 25 then receives regional map data items from the center device 30 as response data for the update request data via the communicator 15 (S160). The received map data items include the latest version of a certain map data item corresponding to the request data ID and a group of map data items having dependence relations with the certain map data item.

The control unit 25 overwrites the received map data items in the map database 13*a* (S170). In detail, the received regional map data items are overwritten on map data items having the identical data IDs in the map database 13*a* to update the old versions to the new versions. As explained above, in this example, as the result of update of the map data, link tables and node tables of the old versions are replaced with those of the new versions, and connection tables of the old versions are also replaced with those of the new versions. The control unit 25 then ends the update acceptance process and waits until an update instruction is inputted again (S110).

In contrast, when an update data provision process is started, the control unit 35 waits until update request data is received from the navigation device 10 via the communicator 31 (S210). Upon receiving the update request data (S210: YES), the control unit 35 reads out the latest version of a map data item having the data ID corresponding to the request data ID indicated by the update request data, from the update map database 33*a*. The read-out latest version is designated as transmission target data (S220).

The control unit 35 then refers to a dependence list corresponding to the data ID with the version of the transmission target data within the dependence table 33*b* (S230) to determine whether there is a map data item having dependence relation with the map data item designated as the transmission target data (S240). In detail, the control unit 35 determines that there is a map data item having the dependence relation when at least one data ID with version is stored in the dependence list.

When the control unit 35 determines that there is no map data item having the dependence relation (S240: NO), the control unit 35 proceeds to S340, where the map data item designated as the transmission target data is transmitted to the navigation device 10. Here, the transmitted data include a header, link table, node table, and connection table with respect to each divisional region. The update data provision process then ends.

In contrast, when the control unit 35 determines that there is a map data item having the dependence relation (S240: YES), the control unit 35 proceeds to S250. At S250, the control unit 35 selects a target ID, which is a data ID with version included in the dependence list and an unprocessed ID not having undergone the process subsequent to S260.

After S250, the control unit 35 proceeds to S260, where the control unit 35 refers to the version information in the version list associated with the same data ID as the target ID and identifies a version (called original version) of the corresponding map data item registered in the map database 13a.

After S260, the control unit 35 determines whether the version of the target ID is larger than the original version (S270). This determination is performed to selectively transmit to the navigation device 10 only the newer version than the map data item registered in the map database 13a.

When the version of the target ID is determined to be less than or equal to the original version (S270: NO), the control unit 35 proceeds to S320. In contrast, when the version of the target ID is determined to be larger than the original version (S270: YES), the control unit 35 proceeds to S280.

At S280, the control unit 35 reads out map data corresponding to the target ID from the update map database 33a. That is, the control unit 35 reads out the map data item, which corresponds to the target ID and corresponds to the version of the target ID, from the update map database 33a.

The control unit 35 then proceeds to S290, where the control unit 35 computes a data amount A to be transmitted (called transmission data amount A). The transmission data amount A is the sum of a total data amount P of map data designated as transmission target data and a data amount (R) of map data read out at S280 (A=P+R).

Next, the control unit 35 determines whether the computed data amount A is smaller than a predetermined threshold value ThO (S300). When the data amount A is determined to be smaller (S300: YES), the control unit 35 proceeds to S310. In contrast, when the data amount A is determined not to be smaller (S300: NO), the control unit 35 proceeds to S340.

The determination at S300 is to control a transmission data amount of map data for update. The threshold value ThO, which can be set as needed, is set to a value corresponding to at least several map data items so that map data having the dependence relation can be simultaneously transmitted as a package.

At S310, the control unit 35 adds the map data read out at S280 to the transmission target data, and the control unit 35 proceeds to S320. At Step S320, the control unit 35 determines whether all IDs registered in the dependence list as reference targets have undergone the process subsequent to S260. When all the IDs are determined not to have undergone (S320: NO), the data amount A computed at S290 is set as the total data amount P (S330). The control unit 35 then proceeds to S250.

In contrast, when all the IDs are determined to have undergone (S320: YES), the control unit 35 proceeds to S340. At S340, the control unit 35 transmits the transmission target data designated at S220 (i.e., map data corresponding to the request data ID) and the data added at S310 (i.e., map data having the dependence relation) via the communicator 31 to the navigation device 10, which is a sender of the update request data. The update data provision process then ends. The control unit 35 then waits until an update request data is received again from the navigation device 10 (S210).

In the above, the update acceptance process by the navigation device 10 and the update data provision process by the center device 30 are explained. As explained above, in the update data provision process, according to the received update request data, the center device 30 transmits the requested map data (the latest version of map data corresponding to the request data ID) and the map data having the dependence relation to the navigation device 10. A new string of roads covering two neighboring divisional regions may be constructed. In this case, the navigation device 10 requests map data corresponding to only one divisional region of the two neighboring divisional regions. Then information on the new string of roads is added to update the map database 13a from the map data D31 and D41 to the map data D32 and D42 in FIG. 8, i.e., from the highest row to the lowest row in FIG. 8.

Further, the center device 30 transmits the transmission target data such that the total data amount does not exceed the threshold value ThO. This may cause the case that not all the map data items of divisional regions, where a new string of roads is constructed, are transmitted at once. In this example, the determination at S270 and the like in the center device 30 prevents re-transmission of map data that has been reflected on the update at the navigation device 10. When the center device 30 receives repeated update request data, the device 30 selectively provides only un-transmitted data having the dependence relation to the navigation device 10.

Figure 8:
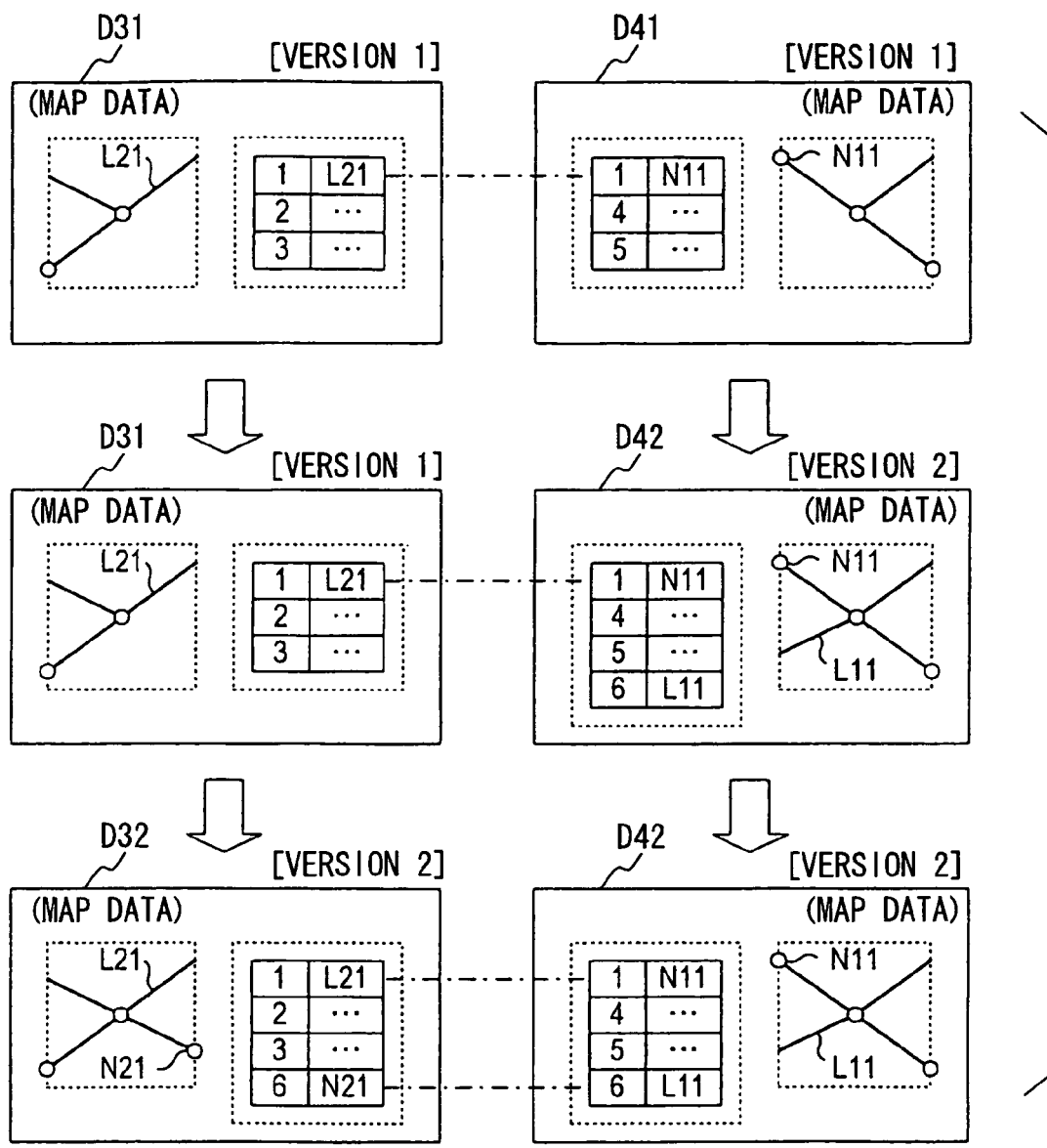
FIG. 8 is a diagram illustrating an update method of the first example.

For instance, because of the limitation of the threshold value ThO, there may be the case that the map database 13a is updated only for change from the highest row to the middle row in FIG. 8. In this case, the navigation device 10 transmits again update request data and thereby receives only necessary map data to update the map database 13a from the middle row to the lowest row in FIG. 8.

Thus in this example, in updating the map database 13a, map data is transmitted as divisional packages and update is performed as divisional operations. This is convenient in a case when a control of an update amount is required. The case when a control of an update amount is required includes a case that transmission of map data is a paid service, a case that processing loads for updating the map data may interfere with other functions of the navigation device 10, or the like.

Further, the map data update system 1 can transmit map data for update as several divisional packages and update map data of divisional regions without breaking off road connections between neighboring divisional regions. This is very convenient in cases where map data needs to be frequently updated. In other words, this example enables the navigation device 10 to constantly maintain the map database 13a in the latest version more conveniently than a conventional method and to provide an accurate route guidance.

Second Example

In the above first example, a connection table is assigned to each divisional region (or mesh); however, it can be assigned to each group of several divisional regions. For instance, as shown in FIG. 9, a group of regional map data items may be formed and each group can be assigned each connection table.

In this case, road connections of roads (nodes or links) within the group (within an area surrounded by heavy lines) are expressed in a manner (using characteristic information of nodes) similar to the conventional method. Roads connected at borders between the neighboring groups (links or nodes connected at the borders shown as heavy lines in FIG. 9) are expressed using a connection table to be further explained below. A modified map data update system as a second example will be explained with reference to FIGS. 9 to 12.

Figure 9:
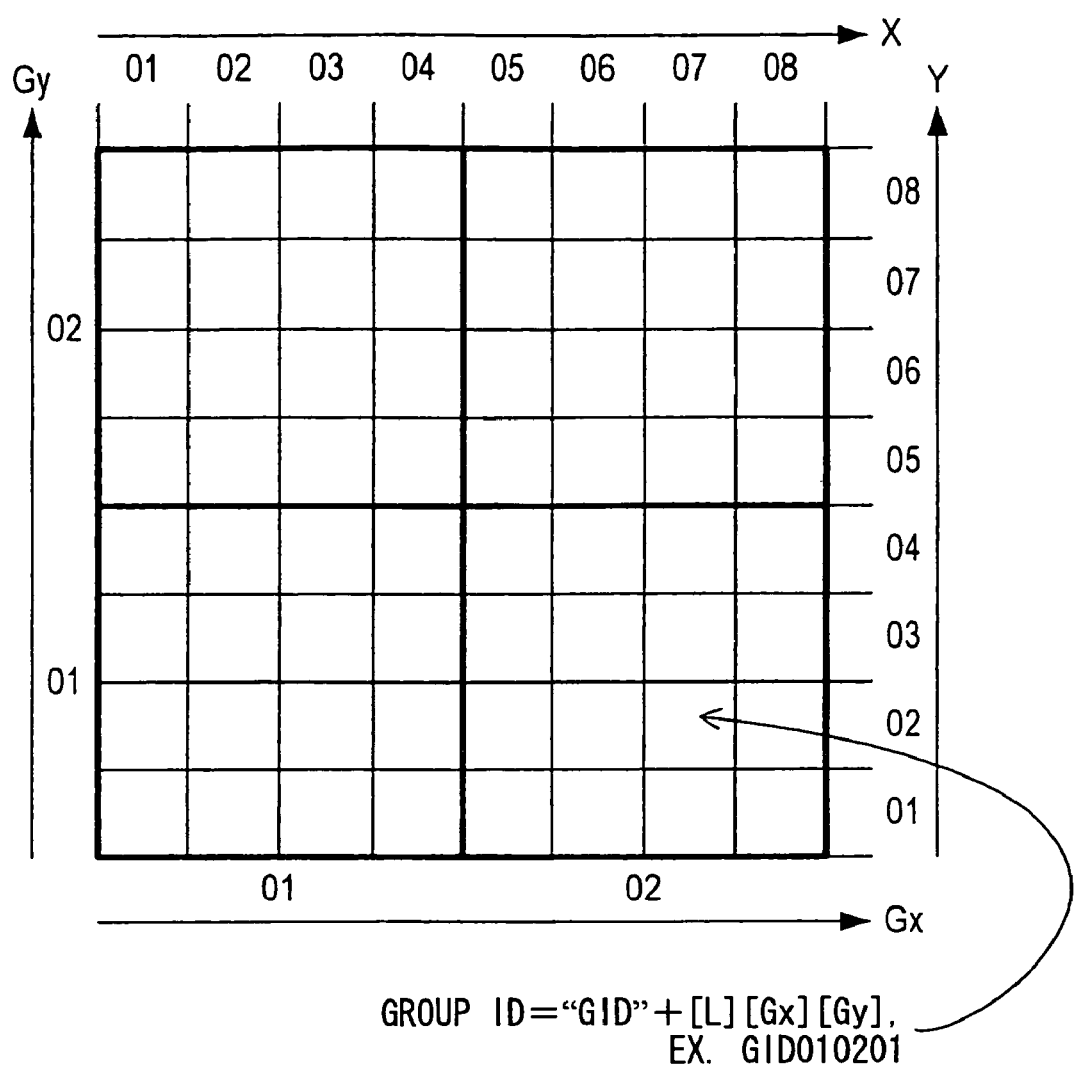
FIG. 9 is a diagram illustrating a method of grouping map data according to a second example.

As shown in FIG. 9, in the modified map data update system, a group of map data is formed to incorporate map data corresponding to sixteen meshes (or divisional regions) of four in the X axis and four in the Y axis. A group ID is assigned to indicate the position of the group.

For instance, a Gx axis is set along the east-to-west direction to assign a Gx coordinate (Gx=1 to n (positive integer)) from the east end (Gx=1). A Gy axis is set along the north-to-south direction to assign a Gy coordinate (Gy=1 to n (positive integer)) from the north end (Gy=1). Each group map data item is assigned a group ID of a character string including values of L, Gx, and Gy in this order.

Figure 10:
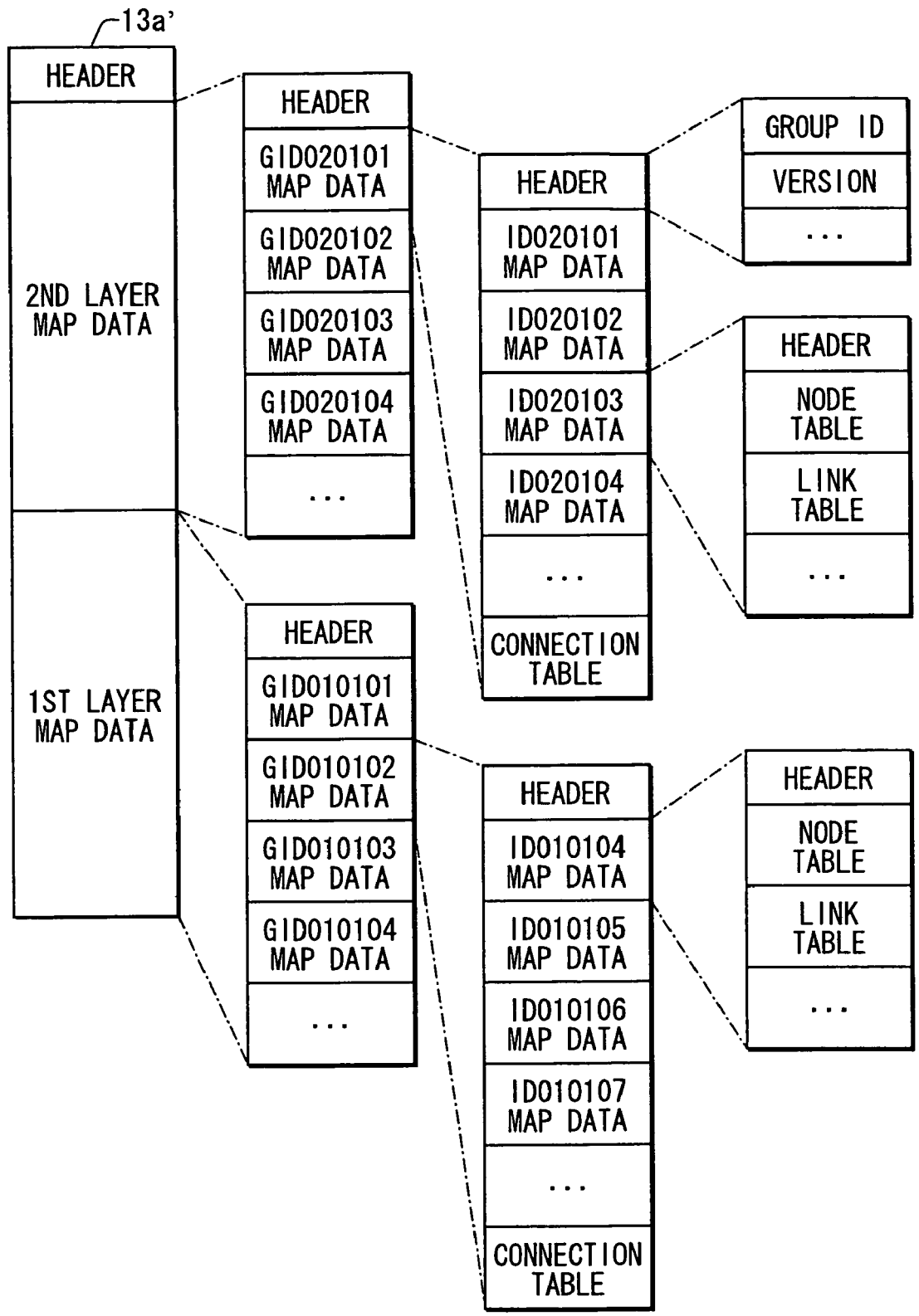
FIG. 10 is a diagram illustrating a configuration of a map database of the second example.

As shown in FIG. 10, the map database 13a' includes a header, first layer map data, and second layer map data. Each of the first layer map data and second layer map data includes multiple group data items, each of which is a map data item for each group. Each group data item includes (i) a header, which has a group ID and a version of the each group data item, (ii) multiple regional map data items included within the group, and (iii) a connection table.

In this modification, each regional map data item includes no connection table unlike the first example shown in FIG. 2. The only one connection table assigned to each group indicates road connections between neighboring groups and has the following structure. Assume that a first road in a certain group connects with a second road in the neighboring group at the border therebetween. In this case, the connection table of the certain group includes a correspondence between the second road and a connection number.

That is, this connection table of the certain group includes a record where the ID (link ID or node ID) of each road, which is in the neighboring group and connected with a road in the certain group, and a corresponding connection number. Further, in the connection table, an identical number is assigned to each of two roads connected with each other at the border of neighboring groups.

In contrast, the center device 30 in the modification includes an update map database 33a' to have versions of group data in correspondence to the map database 13a' in the navigation device 10. The configuration of the update map database 33a' is shown in FIG. 11A.

The configuration of a dependence table 33b' in the modification is shown in FIG. 11 B. The dependence table 33b' includes a dependence group list with respect to each group data registered in the update map database 33a'. The dependence group list indicates a list of group data items, which have dependence relations with each other and are to be transmitted to the navigation device 10 favorably at once.

Each group ID includes no information on a version of group data. The dependence table 33b' uses group IDs with versions. The group IDs with versions are formed by attaching versions indicated by the header of each group data item (see FIG. 10) to follow the group IDs.

Figures 11A, 11B:
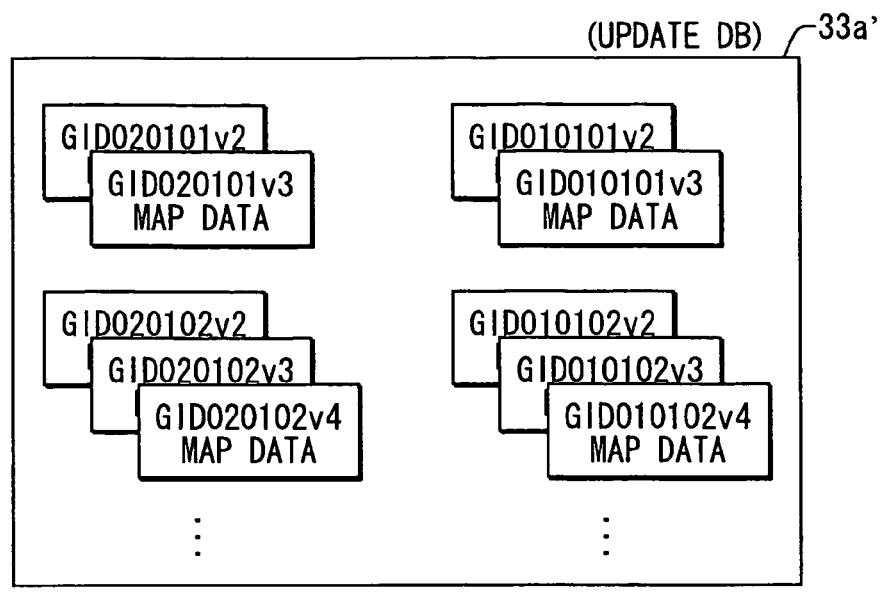
FIG. 11A is a diagram illustrating a configuration of an update map database of the second example.
FIG. 11B is a diagram illustrating a configuration of a dependence table of the second example.

For instance, in FIG. 11B, group data of "GID010101v3," indicating an ID of "010101" and a version of "3" has a dependence relation with a map data item of "GID010102v3," indicating an ID of "010102" and a version of "3."

When the center device 30 receives update request data for requesting a latest version of group data of a certain group ID from the navigation device 10, it provides the latest version of the group data of the certain group ID and group data having the dependence relation with the group data of the certain group ID to the navigation device 10.

Figure 12:
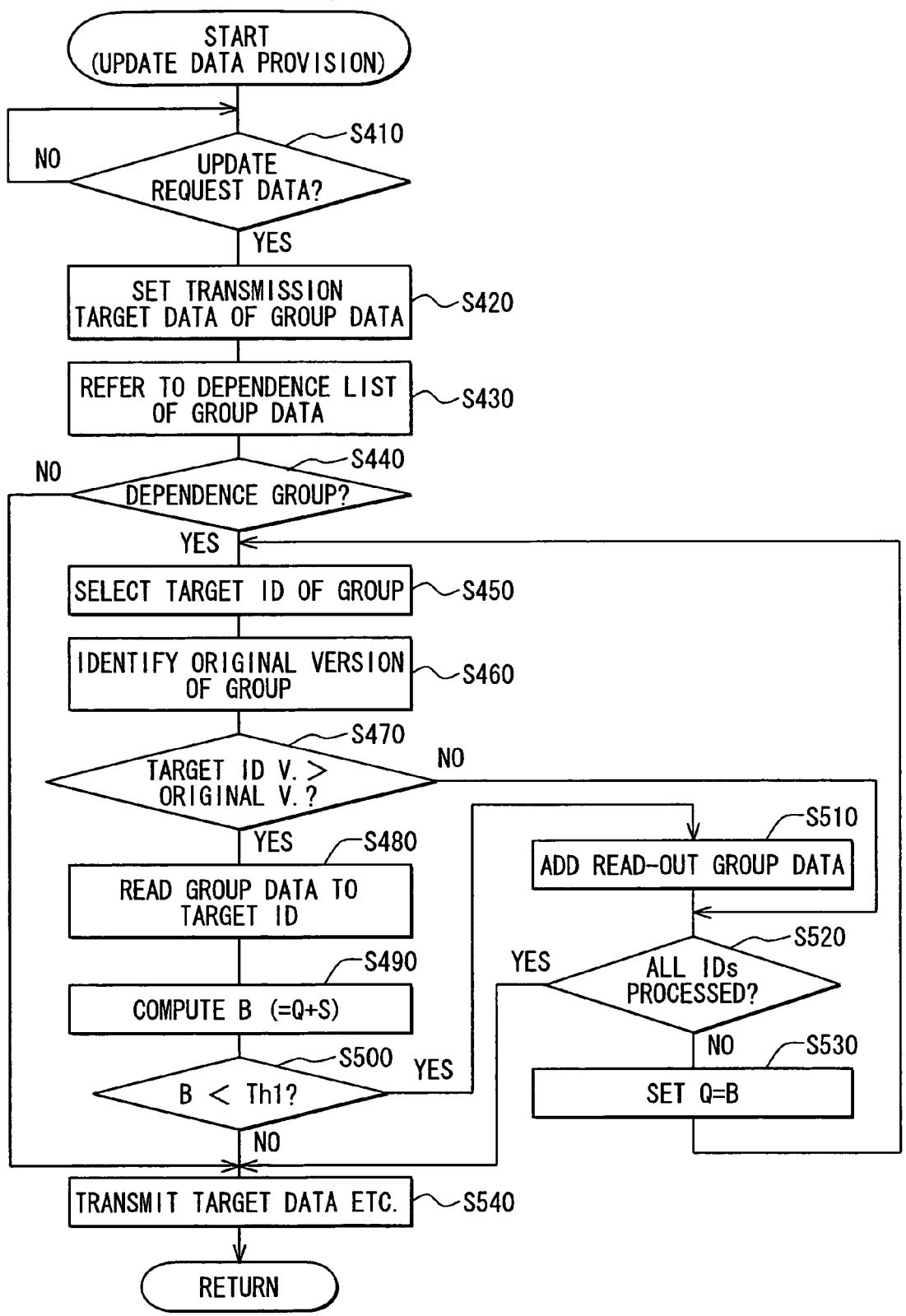
FIG. 12 is a flowchart diagram illustrating an update data provision process of a center device of the second example.
Figure 13:
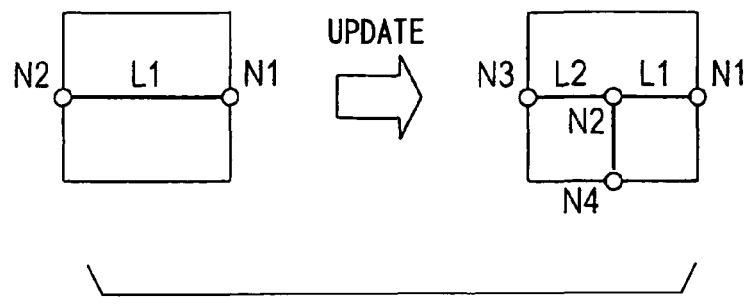
FIG. 13 is a diagram illustrating a method of updating map data due to a road construction in a prior art.
Figure 14:
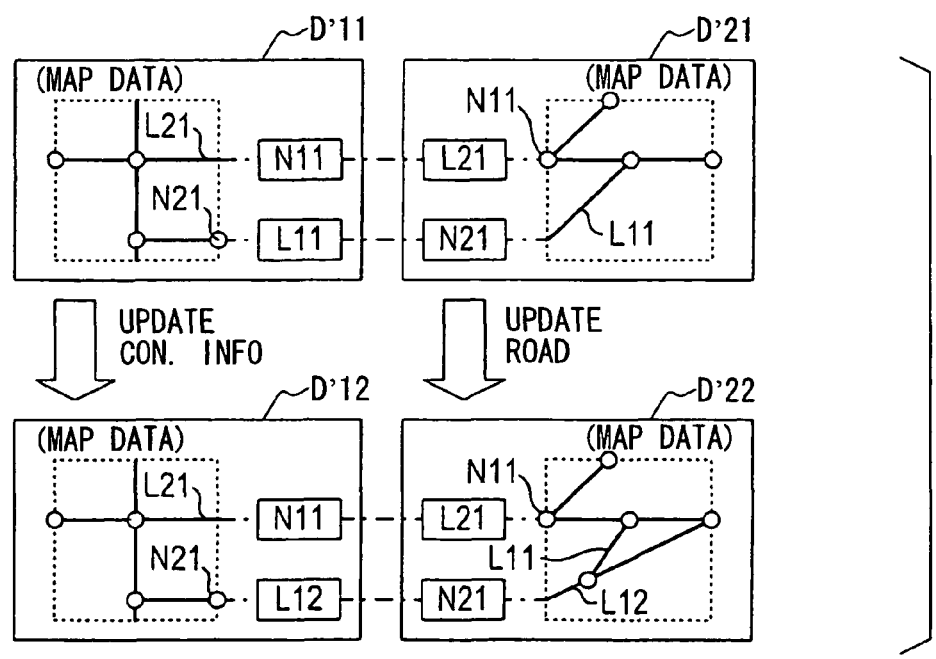
FIG. 14 is a diagram illustrating a configuration of map data in a prior art.
Figure 15A:
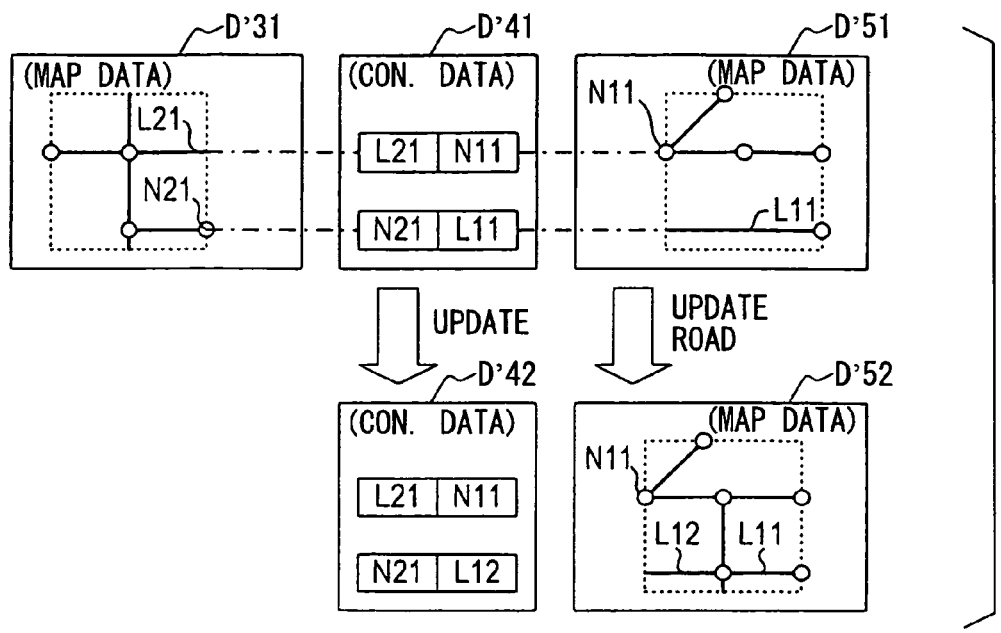
FIG. 15A is a diagram illustrating a configuration of map data in a related art.
Figure 15B:
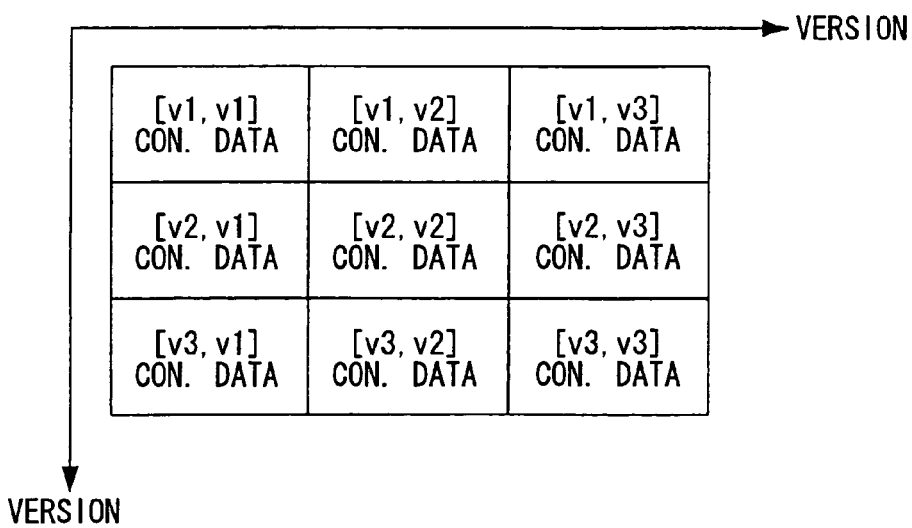
FIG. 15B is a diagram illustrating multiple connection data items for combinations of various versions in the related art.

A flowchart of an update data provision process repeatedly executed by the control unit 35 in the center device 30 in the modification is shown in FIG. 12. When an update data provision process is started, the control unit 35 waits until update request data is received from the navigation device 10 via the communicator 31 (S410). Upon receiving the update request data (S410: YES), the control unit 35 reads out the latest version of the group data item including map data having the data ID corresponding to the request data ID indicated by the update request data, from the update map database 33a'. The read-out latest version is designated as transmission target data (S420).

The control unit 35 then refers to a dependence list corresponding to the group ID with version of the transmission target data within the dependence table 33b'(S430) to determine whether there is a group data item having dependence relation with the group data item designated as the transmission target data (S440). In detail, the control unit 35 determines that there is a group data item having the dependence relation when at least one group ID with a version is stored in the dependence list.

When the control unit 35 determines that there is no group data item having the dependence relation (S440: NO), the control unit 35 proceeds to S540, where the group data item designated as the transmission target data is transmitted to the navigation device 10. The update data provision process then ends.

Here, the navigation device 10 receives the group data item transmitted at S540 as response data to the update request data at S160 in FIG. 6, and then overwrites the received group data item in the map database 13a'. That is, in the modification, the navigation device 10 overwrites each received group data item having a certain group ID in a group data item corresponding to the certain group ID within the map database 13a'. The old version of the group data item is thus updated to the latest version.

In contrast, when the control unit 35 determines that there is a group data item having the dependence relation (S440: YES), the control unit 35 proceeds to S450. At S450, the control unit 35 selects a target ID, which is a group ID with a version included in the dependence list and an unprocessed ID not having undergone the process subsequent to S460.

After S450, the control unit 35 proceeds to S460, where the control unit 35 refers to the version information in the version list associated with the same group ID as the target ID and identifies a version (called original version) of the corresponding group data item registered in the map database 13a'. Here, in this modification, the navigation device 10 generates a version list indicating versions of the groups registered in the map database 13a' at S130 in FIG. 6.

After S460, the control unit 35 determines whether the version of the target ID is larger than the original version (S470). When the version of the target ID is determined to be less than or equal to the original version (S470: NO), the control unit 35 proceeds to S520. In contrast, when the version of the target ID is determined to be larger than the original version (S470: YES), the control unit 35 proceeds to S480.

At S480, the control unit 35 reads out a group data item corresponding to the target ID from the update map database 33a'. That is, the control unit 35 reads out the group data item, which corresponds to the target ID and corresponds to the version of the target ID, from the update map database 33a'.

The control unit 35 then proceeds to S490, where computes a data amount B to be transmitted (called transmission data amount B). The transmission data amount B is the sum of a total data amount Q of the group data item designated as transmission target data and a data amount (S) of the group data item read out at S480 (B=Q+S).

Next, the control unit 35 determines whether the computed data amount B is smaller than a predetermined threshold value Th1 (S500). When the data amount B is determined to be smaller (S500: YES), the control unit 35 proceeds to S510. In contrast, when the data amount B is determined not to be smaller (S500: NO), the control unit 35 proceeds to S540. The threshold value Th1, which can be set as needed, is set to a value corresponding to at least several group data items so that data having the dependence relation can be simultaneously transmitted as a package.

At S510, the control unit 35 adds the group data item read out at S480 to the transmission target data, and the control unit 35 proceeds to S520. At Step S520, the control unit 35 determines whether all group IDs registered in the dependence list as reference targets have undergone the process subsequent to S460. When all the group IDs are determined not to have undergone (S520: NO), the data amount B computed at S490 is set as the total data amount Q (S530). The control unit 35 then proceeds to S450.

In contrast, when all the group IDs are determined to have undergone (S520: YES), the control unit 35 proceeds to S540. At S540, the control unit 35 transmits the transmission target data designated at S420 (i.e., group data corresponding to the request data ID) and data added at S510 (i.e., group data having the dependence relation) via the communicator 31 to the navigation device 10. The control unit 35 then ends the update data provision process. The control unit 35 then waits until an update request data is received again from the navigation device 10 (S410).

In the above, the update data provision process in the modification is explained. As explained above, multiple regional map data items are gathered as a group and a connection table is provided with respect to each group. Therefore, in the modification, compared with the first example where a connection table is provided to map data corresponding to each divisional region, a reference count, which is the number of times that connection tables are referred to when a route retrieval or the like is performed, can be decreased. This modification allows road connections to be more quickly obtained. A user is smoothly provided with execution results from the route retrieval or the like.

Further, the data amount in the connection tables can be decreased, resulting in decrease of the data amount in the map database 13a'. In the modification, the data amount for communication between the center device 30 and navigation device 10 increases compared with the first example. Therefore, the size of a group, into which regional map data items are gathered, should be appropriately designated.

(Others)

For instance, to update the old version of map data, the center device 30 can transmit only a difference between the latest version and old version instead of all the latest version.

In the connection table, the connection number can be removed by alternatively using corresponding row numbers of the table. However, providing connection numbers simplifies amendment in the table when updating the map data, e.g., no need to have an empty row, which provides an advantage in retrieval efficiency.

Further, connection tables can be provided to four directions of each of divisional regions or groups. For instance, with respect to a map data item corresponding to a reference divisional region, the following four connection tables can be provided: an east connection table, a west connection table, a south connection table, and a north connection table. For instance, a road connection is formed at a border between a first road in the reference divisional region and another road in the east-side neighboring divisional region, which is located at the east side of the reference divisional region. The east connection table indicates the road connection at the east side by showing a correspondence between the first road and a corresponding connection number.

In this case, the navigation device 10 may be designed to interpret the following. The east connection table of the reference divisional region is compared with the west connection table of the east-side neighboring divisional region, and two roads in both the regions, to which an identical connection number is assigned, are mutually connected at the border between the two regions. Naturally, with respect to other directions, the same interpretation can be made.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A method for generating road map data in a center device for a navigation device in a vehicle, the road map data indicating a plurality of regions, each region including a connection road which is connected with a connection road included in an adjacent region, the method, comprising:
  generating a regional map data item for each region of the plurality of regions, each region being associated with position information;
  assigning each region with connection information which indicates a correspondence between a node ID and a link ID of the connection road in each region which is connected to the connection road in the adjacent region and a connection number, the connection number being identically assigned to the connection road in each region and the connection road in the adjacent region; and
  generating wide area road map data, which covers the plurality of regions while indicating road connections between adjacent regions by storing regional map data items of the plurality of regions in a storage medium such that a regional map data item for each region is provided with connection information while being associated with the position information; wherein
  when the road map data is being updated, in each region, the node ID or the link ID of the connection road connected with the connection road in the adjacent region is changed, the corresponding connection number is not changed.

2. The method of claim 1,
wherein the regional map data item for the each region includes main data indicating road connections of roads within the each region using node IDs and link IDs of the roads in each region, and
wherein the regional map data item for each region includes the connection information which indicates the correspondence between the node ID and the link ID of the connection road connected with the connection road in the adjacent region and the connection number as auxiliary data.

3. A road map data update system comprising:
a communicating device configured to include a road map data storage unit storing road map data, which includes regional map data items, each of which is for each region of a plurality of regions,
each region including a connection road which is connected with a connection road included in an adjacent region at a border between each region and the adjacent region,
a pair of the connection road in each region and the connection road in the adjacent region being assigned a connection number,
the regional map data item for the each region including main data indicating road connections of roads within each region, using node Ds and link IDs of the roads within each region, and auxiliary data indicating a correspondence between a node ID and a link ID of the connection road connected with the connection road in the adjacent region and the connection number; and
an update data provision device configured to
include an update data storage unit storing update data for updating the road map data in the communicating device, the update data including main update data for updating the main data and auxiliary update data for updating the correspondence indicated by the auxiliary data, and
transmit the update data to the communicating device when a transmission condition is satisfied,
the communicating device being further configured to update the main data and the auxiliary data in a regional map data item corresponding to the update data which is received from the update data provision device, wherein the connection number is not changed even when the auxiliary data is updated.

4. A road map data management device comprising:
a road map data storage unit storing road map data, which includes regional map data items, each of which is for each region of a plurality of regions,
each region including a connection road which is connected with a connection road included in an adjacent region at a border between each region and the adjacent region,
the connection road in each region and the connection road in the adjacent region being assigned an identical connection number,
the regional map data item for the each region including main data indicating road connections of roads within each region, using node IDs and link IDs of the roads within each region and auxiliary data indicating a correspondence between a node ID and a link ID of the connection road in each region being connected with the connection road in the adjacent region and the connection number;
means for obtaining, from an outside source, update data for updating the map data, the update data including main update data for updating the main data and auxiliary update data for updating the correspondence indicated by the auxiliary data; and
means for updating the main data and the auxiliary data only in a regional map data item corresponding to update data which is obtained by the obtaining means, wherein the connection number is not changed even when the auxiliary data is updated.

* * * * *